US011247280B2

(12) United States Patent
Embretsen et al.

(10) Patent No.: US 11,247,280 B2
(45) Date of Patent: Feb. 15, 2022

(54) ROTATABLE TOOL FOR FORMING BY METAL CUTTING A CIRCULAR GROOVE

(71) Applicant: SANDVIK INTELLECTUAL PROPERTY AB, Sandviken (SE)

(72) Inventors: Michael Embretsen, Gavle (SE); Stefan Persson, Amotsbruk (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 16/891,801

(22) Filed: Jun. 3, 2020

(65) Prior Publication Data
US 2020/0290133 A1   Sep. 17, 2020

Related U.S. Application Data

(62) Division of application No. 15/531,350, filed on May 26, 2017, now abandoned.

(30) Foreign Application Priority Data

Nov. 28, 2014   (EP) ..................................... 14195481
Oct. 26, 2015   (WO) .................. PCT/EP2015/074758

(51) Int. Cl.
   *B23C 3/34*   (2006.01)
(52) U.S. Cl.
   CPC ........ *B23C 3/34* (2013.01); *B23C 2200/0433* (2013.01); *B23C 2210/285* (2013.01); *B23C 2220/36* (2013.01)
(58) Field of Classification Search
   CPC ......... B23C 3/30; B23C 3/34; B23C 2220/36; B23C 2220/52; B23C 2220/68;
   (Continued)

(56) References Cited

U.S. PATENT DOCUMENTS

| 2,406,442 | A | * | 8/1946 | Smith | ..................... B23B 51/05 |
| | | | | | 408/86 |
| 2,468,562 | A | * | 4/1949 | Lank | ...................... B23B 51/05 |
| | | | | | 144/219 |
| 4,943,191 | A | * | 7/1990 | Schmitt | ................. B23G 5/184 |
| | | | | | 408/1 R |

FOREIGN PATENT DOCUMENTS

| DE | 346689 C | * | 1/1922 | ............ B23B 51/05 |
| JP | 60146611 A | * | 8/1985 | .............. B23C 3/34 |

(Continued)

OTHER PUBLICATIONS

Description WO2013030351A1 (translation) obtained at https://worldwide.espacenet.com/ (last visited Jun. 29, 2021).*

(Continued)

*Primary Examiner* — Ryan Rufo
(74) *Attorney, Agent, or Firm* — Corinne R. Gorski

(57) ABSTRACT

A rotatable tool for producing a circular groove through metal cutting in a metal work piece and a method of forming the circular groove with the rotatable tool is disclosed. The rotatable tool includes a front end and a second end. The front end includes a first radially outer cutting edge and a second radially inner cutting edge, where the first radially outer cutting edge is located at a larger radial distance from the tool center axis than any other cutting edge of the rotatable tool, and where the second radially inner cutting edge is located at a smaller radial distance from the tool center axis than any other cutting edge of the rotatable tool.

9 Claims, 3 Drawing Sheets

(58) Field of Classification Search
CPC ........ B23C 2210/285; B23C 2210/325; B23G 5/182; B23G 5/184; B23B 51/05
See application file for complete search history.

(56) References Cited

FOREIGN PATENT DOCUMENTS

| | | | | |
|---|---|---|---|---|
| SU | 1199481 A1 | * | 12/1985 | ............... B23C 3/34 |
| WO | WO-2013030351 A1 | * | 3/2013 | ............... B23C 3/34 |

OTHER PUBLICATIONS

Description DE346689C (translation) obtained at https://worldwide.espacenet.com/ (last visited Jul. 1, 2021).*
JP,60-146611 ,A(1985) (Human Translation obtained on Oct. 18, 2021).*
PARTWO2013030351A (Human Partial Translation obtained on Oct. 18, 2021).*

* cited by examiner

ROTATABLE TOOL FOR FORMING BY METAL CUTTING A CIRCULAR GROOVE

RELATED APPLICATION DATA

This application is a divisional of U.S. patent application Ser. No. 15/531,350 filed May 26, 2017, which is a § 371 National Stage Application of PCT International Application No. PCT/EP2015/074758 filed Oct. 26, 2015 claiming priority of EP Application No. 14195481.8, filed Nov. 28, 2014.

TECHNICAL FIELD

The present invention relates generally to a rotatable tool and a method to form a circular groove with such tool. More precisely, to a rotatable tool for forming by metal cutting a circular groove in a metal work piece, comprising a front end and a rear end, wherein the rotatable tool is rotatable in a given direction of rotation around a tool center axis which is a longitudinal axis of the rotatable tool, the front end comprises two cutting edges located on opposite sides and at a distance from the tool center axis.

BACKGROUND

When producing by metal cutting a circular groove in a work piece, several tools and methods are known. One common type of circular groove is a seal ring groove. It is used in components in the oil industry. Common shapes of such seal ring grooves are defined by the American Petroleum Institute standard 6A. Such seal ring grooves have a bottom surface, an inner wall surface and an outer wall surface. The seal ring groove has an opening in a flat surface. The outer and inner walls are tapered in such a way that the bottom of the groove is narrower than the opening. The material of the components which comprise such seal ring groove can be different types of steel alloys.

Common ways to produce seal ring grooves is by machining, also called metal cutting. A work piece is clamped in a CNC (computer numerical control) machine, e.g. a machining center, which has a rotatable machine spindle, in which a rotatable tool is clamped. The tool is then rotated around the center axis thereof and is moved relative to the work piece. This movement is called feed.

The rotatable tool includes at least two cutting inserts, which are mounted in insert seats, usually by screws. During machining, material from the work piece is removed in the form of chips. Cutting edges of the inserts go into the work piece and cut the chips. The cutting inserts gets worn by cutting. For example, a common form of wear, or tool wear, is flank wear. When the cutting insert is worn, it can be replaced by a new one. Alternatively, it may have a non-used cutting edge or cutting edges, which can be used. For example, parallelogram-shaped cutting inserts usually have 2 or 4 equally shaped cutting portions, i.e. set of cutting edges. Therefor, they may be used 2 or 4 times, before being replaced by a new cutting insert.

A method to produce by metal cutting a circular groove is disclosed in WO2013/030351A1. A rotating tool includes two opposite cutting inserts that rotate around the center axis thereof. The tool center axis is located at a constant distance from and rotates around the groove center axis. Outer and inner cutting edges of both cutting inserts form the same angle relative to the tool center axis.

It is advantageous that circular grooves, such as seal ring grooves, after one machining operation with one rotatable tool have a shape which is geometrically accurate and precise. Moreover, it is more economical to produce the seal ring groove as fast as possible with as low cost as possible, with as long tool-life as possible, where the tolerances of the tool has as little impact as possible on the dimensional accuracy of the finished circular groove after machining or cutting.

The rotatable tool, and the method, disclosed in WO2013/030351A1 have the disadvantage that there is a risk that the geometrical accuracy of the walls of the circular groove after cutting is not sufficient. A further disadvantage is that the pressure or load on the insert will increase on the insert during cutting, because the chip thickness and hence the removed volume of material per time unit will increase during cutting.

SUMMARY

An object of the invention is to reduce at least one of the above disadvantages. This object is achieved by a rotatable tool for forming, by metal cutting, a circular groove in a metal work piece, including a front end and a rear end, wherein the rotatable tool is rotatable in a given direction of rotation around a tool center axis, which is a longitudinal axis of the rotatable tool. The front end includes two cutting edges located on opposite sides and at a distance from the tool center axis, wherein the two cutting edges have a first radially outer cutting edge and a second radially inner cutting edge, wherein the first radially outer cutting edge is located at a larger radial distance from the tool center axis than any other cutting edge of the rotatable tool, and wherein the second radially inner cutting edge is located at a smaller radial distance from the tool center axis than any other cutting edge of the rotatable tool.

By having two cutting edges, which have a first radially outer cutting edge and a second radially inner cutting edge, where the first radially outer cutting edge is located at a larger radial distance from the tool center axis than any other cutting edge of the rotatable tool, and wherein the second radially inner cutting edge is located at a smaller radial distance from the tool center axis than any other cutting edge of the rotatable tool, only the first outer cutting edge cuts or generates the final shape of the outer wall surface of the circular groove, and only the second inner cutting edge cuts or generates the final shape of the inner wall surface of the circular groove.

The second radially inner cutting edge is opposite the first radially outer cutting edge, this means that they are spaced apart by substantially 180 degrees, or 175-185 degrees, around the tool center axis. With such a rotatable tool, the dimensional accuracy of the rotatable tool affects the dimensional tolerances of the circular groove walls to a lesser degree. Such a tool is suitable for machining a variety of circular grooves of different diameters.

That the first outer cutting edge is an outer cutting edge means that it has a corresponding rake face located radially inside, i.e. closer to the tool center axis. That the second radially inner cutting edge is an inner cutting edge means that it has a corresponding rake face located radially outside, i.e. further away from the tool center axis. The first radially outer cutting edge has a shape which corresponds to the shape of the outer wall surface of the circular groove formed by the cutting operation. The second radially inner cutting edge has a shape which corresponds to the shape of the inner wall surface of the circular groove formed by the cutting operation.

That the first radially outer cutting edge is located at a larger radial distance from the tool center axis than any other cutting edge of the rotatable tool means that in a plane perpendicular to the tool center axis, the point of the radially outer cutting edge located in that plane is located at a larger radial distance from the tool center axis than any other points of cutting edges of the rotatable tool located in that plane. All the points of the radially outer cutting edge need not necessarily be located at a larger radial distance from the tool center axis than any other cutting edge of the rotatable tool.

In a corresponding way, in a plane perpendicular to the tool center axis, the point of the second radially inner cutting edge is located at a smaller radial distance from the tool center axis than any other points of cutting edges of the rotatable tool located in that plane. The tool center axis is a longitudinal axis of the tool, where the cutting edges are located in a front or forward longitudinal direction, and the rear end is located in an opposite rearward longitudinal direction.

The rear end may be in the form of a rear coupling part suitable to be coupled in a rotatable machine tool spindle. The rear coupling part can be conically shaped or tapered, wherein rear coupling part is substantially symmetrically arranged around the tool center axis, such that the rear coupling part has a center axis which is located at the tool center axis. The rotatable tool may also be formed in one monolithic piece of wear resistant material, such as cemented carbide.

According to one embodiment the rotatable tool includes a first radially inner cutting edge, a first corner cutting edge, a second radially outer cutting edge and a second corner cutting edge. The first radially outer cutting edge and the first radially inner cutting edge converge towards each other and are connected by the first corner cutting edge. The second radially outer cutting edge and the second radially inner cutting edge converge towards each other and are connected by the second corner cutting edge. The first radially inner cutting edge and the second radially outer cutting edge are located on opposite sides and at a distance from the tool center axis. The first corner cutting edge and the second corner cutting edge are located on opposite sides and at a distance from the tool center axis, the first corner cutting edge being located at a distance P from the tool center axis, and the second corner cutting edge being located at a distance P' from the tool center axis. By this, there are a larger number of cutting edges, and hence faster metal removal is possible.

Further, since the rotatable tool includes two radially outer and two radially inner cutting edges, a movement of the tool, which has radial components in opposite directions, is possible, such as when the tool center axis rotates around the groove center axis. The corner cutting edges may have the shape of a segment of a circle with a radius of 0.1-4 mm, for example, 0.4-2.4 mm By this, the tool is suitable to machine or cut a finished groove, which has curved portions connected to the bottom surface, such as e.g. seal ring grooves. Moreover, the wear will be reduced, compared to if corner cutting edges would be sharp or have smaller curvatures.

According to one embodiment, the distance P is equal or larger than the distance P'. By having such distances equal, the tool has an improved rotational balancing, or a center of mass located close to or at the tool center axis. By having the distance from the tool center axis to the first corner cutting edge being larger than a distance from the tool center axis to the second corner cutting edge, the risk is reduced that the second radially outer cutting edge cuts the final shape of the outer wall surface.

This risk is mainly or solely due to the dimensional accuracy or tolerances of the rotating tool. The distance P is 0.1-1.0 mm larger than the distance P'. A further improvement is achieved when the distance P is 0.3-0.5 mm larger than the distance P'.

According to one embodiment, the first radially outer cutting edge forms a first outer edge angle $\alpha$ with the tool center axis, the first radially inner cutting edge forms a first inner edge angle $\beta$ with the tool center axis, the second radially outer cutting edge forms a second outer edge angle $\alpha'$ with the tool center axis, the second radially inner cutting edge forms a second inner edge angle $\beta'$ with the tool center axis, the first and second radially outer cutting edges converge away from the rear end, and the first and second radially inner cutting edges converge towards the rear end. Each of the angles $\alpha$, $\beta$, $\alpha'$ and $\beta'$ are larger than zero degrees and smaller than 90 degrees. For example, each of the angles $\alpha$, $\beta$, $\alpha'$ and $\beta'$ may be between 1 and 89 degrees, or between 5 and 45 degrees. At least the first radially outer cutting edge and the second radially inner cutting edge are preferably straight.

According to one embodiment, the first outer edge angle $\alpha$ is larger than the second outer edge angle $\alpha'$, the second inner edge angle $\beta'$ is larger than the first inner edge angle $\beta$, the first outer edge angle $\alpha$ is larger than the first inner edge angle $\beta$, and the second outer edge angle $\alpha'$ is smaller than the second inner edge angle $\beta'$. By such an arrangement, there is reduced risk that the first radially inner cutting edge forms or generates the inner wall surface and there is a reduced risk that the second radially outer cutting edge generates the outer wall surface, especially near the bottom surface of the circular groove, i.e., when the first and second cutting edges are near or at the bottom surface of the circular groove. As a result, any mismatch or deviation from an ideal circular groove profile will be less dependent on tolerances with regards to position and orientation of the cutting edges. Further, as a result, any mismatch or deviation from an ideal inner and outer wall surface will be located only at the portion of the inner and outer wall surface located adjacent to the bottom surface of the circular groove.

By such an arrangement, there is a reduced risk of chip jamming when the first radially inner cutting edge is in a position such that it is close to the inner wall surface adjacent to the bottom surface of the circular groove. Also, by such an arrangement, there is a reduced risk of chip jamming when the second radially outer cutting edge is in a position close to the outer wall surface adjacent to the bottom surface of the circular groove. Accordingly, the rotatable tool can be made from less volume of material, i.e., it can be made lighter, compared to if the the first inner edge angle $\beta$ and the first outer edge angle $\alpha$ would be equal and the second outer edge angle $\alpha'$ and the second inner edge angle $\beta'$ would be equal. By such an arrangement, provided that cutting inserts are used, a wider range of cutting insert can be used, i.e., not only cutting inserts which have a nose angle which corresponds to the angle formed between the inner and outer wall surfaces but also cutting inserts which have a smaller nose angle.

According to one embodiment, the rotatable tool has a first cutting insert and a second cutting insert. The first cutting insert includes the first radially outer cutting edge, the first radially inner cutting edge and the first corner cutting edge. The second cutting insert includes the second radially outer cutting edge, the second radially inner cutting edge and the second corner cutting edge. By this, the part of the rotatable tool that is subjected to wear during cutting is the cutting inserts, which can be replaced after use. Also, the cutting inserts can have a design which does not correspond to the shape of the circular groove to be formed. Only the first radially outer cutting edge and the second radially inner cutting edge needs to have shapes, which when the inserts are mounted, corresponds to the shape of the outer and inner wall surface, respectively. Hence, the same inserts can be used for forming circular grooves of a range of diameters and widths.

The cutting inserts can be made of a more wear resistant material, e.g. cemented carbide, than the other parts of the rotatable tool. By such an arrangement, the first cutting insert and the second cutting insert can after use be placed in opposite seats or opposite positions, which give better cutting edge utilization. This is because the first radially inner cutting edge, which is inactive, will have no insert wear after use in a first position, and can therefor function as a new cutting edge when placed in an opposite insert seat, or an opposite position, where it functions as an active second radially inner cutting edge.

According to one embodiment, the first cutting insert has a shape of a parallelogram, where the first radially outer cutting edge and the first radially inner cutting edge form two adjacent sides of the parallelogram and the first corner cutting edge forms a corner of the parallelogram. The second cutting insert also has a parallelogram shape, where the second radially outer cutting edge and the second radially inner cutting edge forms two adjacent sides of the parallelogram and the second corner cutting edge forms a corner of the parallelogram, in that the first and second cutting inserts are identical, and the first corner cutting edge and second the corner cutting edge are located at longitudinal equidistant positions. By having identical inserts, the number of insert types can be reduced.

Parallelogram shaped inserts, i.e., a parallelogram when the rake face is facing the viewer, is a common insert shape in turning. The nose angle is preferably 35 degrees, such as for VBMT inserts. The outer and inner cutting edges of both the first and second cutting inserts are straight, therefore the tool can cut or machine a finished circular groove with straight inner and outer wall surfaces, such as a seal ring groove. By this, each cutting insert can be used two times. The first cutting insert and the second cutting insert can after use be mounted it the opposite insert seat. This can be economical, because the wear pattern of the first and second cutting inserts after cutting will be located on different portions. Therefore, cutting insert consumption may be reduced. By having the first corner cutting edge and second the corner cutting located at longitudinal equidistant positions, it is possible to form a flat bottom surface of the circular groove.

According to one embodiment, the rotatable tool includes radial positioning means such that at least one of the first radially outer cutting edge and second radially inner cutting edge can be positioned on at least two different radial distances from the tool center axis. By this, circular grooves of different widths can be used with the same rotatable tool.

The above mentioned object is further achieved by a method for forming by metal cutting a circular groove in a metal work piece which includes the steps of: providing a rotatable tool according to the invention or any of the above embodiments; providing a metal work piece including a surface, which is perpendicular to a groove center axis; setting the tool center axis parallel and at a distance X from the groove center axis; rotating the rotatable tool around the tool center axis; rotating the tool center axis around the groove center axis; moving the rotatable tool in a forward longitudinal direction towards the work piece such that the cutting edges of the rotatable tool enter the metal work piece; gradually decreasing the distance X and simultaneously moving the rotatable tool in a forward longitudinal direction, thereby forming in the metal work piece a circular groove including a bottom surface, an inner wall surface formed by the second radially inner cutting edge, and an outer wall surface formed by the first radially outer cutting edge, and an opening in the surface of the work piece which is perpendicular to a groove center axis of the circular groove.

By gradually decreasing the distance X, i.e., the distance from the tool center axis to the groove center axis, during cutting, the chip thickness will be reduced, thereby improving the tool-life of the cutting edges. Also, the cutting edges will during cutting have a movement in the form similar to a helical cone, albeit not a perfect circular cone. In other words, a reference point of the rotatable tool located at the tool center axis will during cutting, when the tool is moving toward the bottom surface of the circular groove, move at an angle relative to the groove center axis. This angle is larger than zero, for example, equal to or smaller than the angle that the outer wall surface of the circular groove forms relative to the groove center axis. This angle can be equal to or up to 3 degrees less, or 0.5-1.5 degrees less, than the angle that the outer wall surface of the circular groove forms relative to the groove center axis. In other words, X is reduced during cutting to the same degree, or to a lesser degree, than the distance from the groove center axis to the outer wall surface is reduced during cutting. In this way, the dimensional accuracy of at least the outer wall surface of the circular groove is improved.

According to one embodiment, the method further comprises the steps of entering the work piece with the corner cutting edges, and when the corner cutting edges enters the work piece setting $X=(F+P-P')/2$, where F is the width of the opening of the circular groove when the width F is in a plane perpendicular to the groove center axis. In this way, the dimensional accuracy of at least the outer wall surface of the circular groove is improved.

According to one embodiment, the method further comprises the steps of when the corner cutting edges are at the bottom surface of the circular groove, setting $X=(C+P-P')/2$, where C is the width of the bottom surface of the circular groove, when the width C is in a plane perpendicular to the groove center axis. In this way, the dimensional accuracy of at least the outer wall surface of the circular groove is improved.

According to one embodiment, the method further comprises the step of setting $P+P'=2E$, where E is the distance from the groove center axis to a center point of the circular groove. In this way, the dimensional accuracy of at least the outer wall surface of the circular groove is improved.

According to one embodiment, the method further comprises the step of setting $P \leq P'+C/2$, where C is the width of the bottom surface of the circular groove, when the width C is in a plane perpendicular to the groove center axis. In this way, the dimensional accuracy of at least the outer wall surface of the circular groove is improved.

According to one embodiment, the method further comprises the steps of setting the first outer edge angle $\alpha$ to be equal to an outer wall angle $\gamma$ which outer wall angle $\gamma$ is the angle the outer wall surface forms with the groove center axis, setting the second inner edge angle $\beta'$ to be equal to the inner wall angle $\delta$ which inner wall angle $\delta$ is the angle the inner wall surface forms with the groove center axis, setting the sum of the first outer edge angle $\alpha$ and the first inner edge angle $\beta$ to be smaller than the sum of the outer wall angle $\gamma$ and the inner wall angle δ, setting the sum of the second outer edge angle α' and the second inner edge angle β' to be smaller than the sum of the outer wall angle γ and the inner wall angle δ, and forming the bottom surface such that the bottom surface is located in a plane perpendicular to the groove center axis. In this way, the dimensional accuracy of at least the outer wall surface of the circular groove is improved.

According to one embodiment, the method further comprises the steps of forming a seal ring groove. A seal ring groove has both an outer wall angle and an inner wall angle in the range of 22-24 degrees, for example, 23 degrees. The seal ring groove further may have at least the following dimensional characteristics: F=5-18 mm; H=3-9 mm; C=1.5-11 mm where $1.6 < F/C < 2.8$; $1.4 < F/H < 2.2$; and $0.7 < H/C < 2.0$, F being the width of the opening of the circular groove, C the width of the bottom surface of the circular groove, and H the depth of the circular groove, i.e. the distance from the bottom surface to the opening, in a direction parallel to the groove center axis. The bottom surface is located in a plane which is perpendicular to the groove center axis. Between the bottom surface and both the inner wall surface and the outer wall surface, there are curved portions formed, of a constant radius in the range of 0.4-2.4 mm. The seal ring groove is symmetric around a center thereof. The inner wall surface and the outer wall surface are straight and tapered in such a way that the opening of the groove is wider than the bottom surface of the groove.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1:
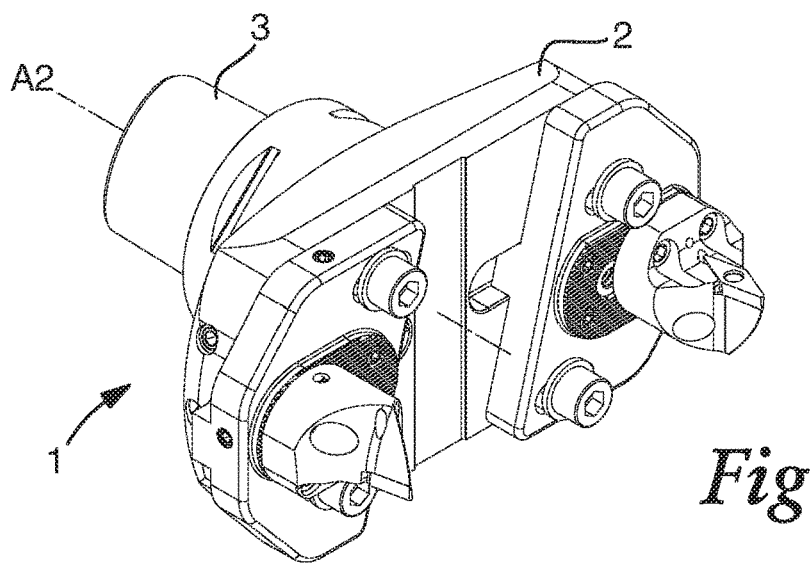
FIG. 1 is a perspective view of a rotatable tool according to the invention.
Figure 2:
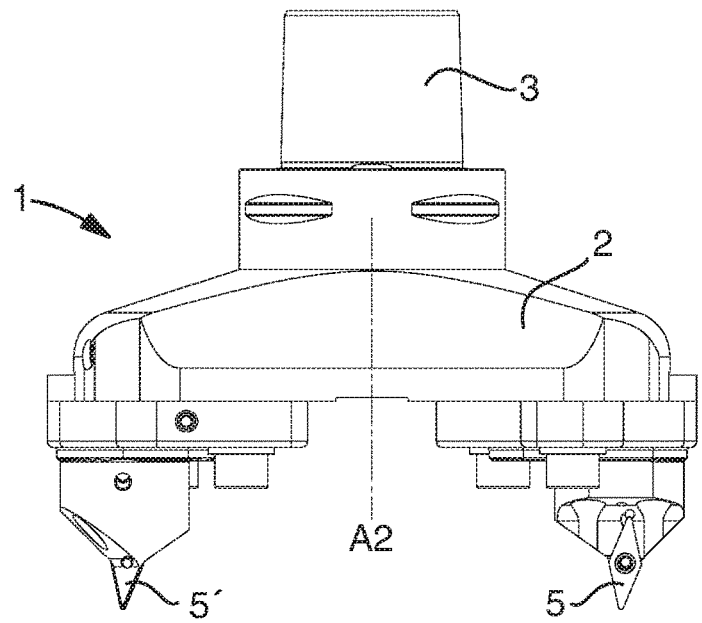
FIG. 2 is a side view of the rotatable tool as in FIG. 1.

Referring to FIGS. 1-5, a rotatable tool 1 is shown. It is has a longitudinally rear end in the form of a coupling part 3 suitable to be coupled in a machine tool spindle in a machine, such as a CNC-machine, e.g. a machining center, having a computer program having instructions, which when executed by the computer numerical control machine causes the computer numerical control machine to perform the disclosed method. Alternatively, the CNC-machine can be connected to an extension part or extension tool, which is coupled in a machine tool spindle. The coupling part 3 is substantially symmetrical around the tool center axis, which is a longitudinal axis, also the axis around the tool rotates during machining.

The coupling part 3 is conical in shape, with a narrow portion at a longitudinal end, and a wider portion closer to a longitudinal front part of the tool. The tool body part 2 is located between the rear coupling part and the longitudinal front part. In the front part, there are formed insert seats, or pockets, in which first and second cutting inserts 5, 5' can be mounted by screws through a center hole in each of the inserts. Alternatively, the inserts can be arranged in the seats by top clamps, which press against a top surface of each of the inserts. The top surface is a rake face, i.e., a surface against which chips during metal cutting are pressed against. Opposite the top surface is a bottom surface, which is in contact with the insert seat. A hole for a screw has openings in the top surface and the bottom surface. The top surface and the bottom surface of each cutting insert 5, 5' are connected by side surfaces, at least one of which during metal cutting is a clearance surfaces.

Each cutting insert 5, 5' has cutting edges 6, 6', 7, 7', 8, 8' connecting the top surface and the side surfaces. Each insert has a parallelogram shape in a top view, i.e., with the rake face against the viewer. Opposite acute corners of the parallelogram are 35 degrees, which is within a chosen range of 20-45 degrees. Opposite obtuse corners are 145 degrees. At the acute corners of the parallelogram shaped cutting inserts 5, 5' there are formed corner cutting edges 8, 8'. The corner cutting edges 8, 8' are the part of the tool, which first cuts chips from the work piece. The corner cutting edges 8, 8' are longitudinal front end points or longitudinal front end portions of the tool, where the tool center axis A2 is a longitudinal axis, and the rear coupling part 3 include a longitudinal rear end.

Figure 3:
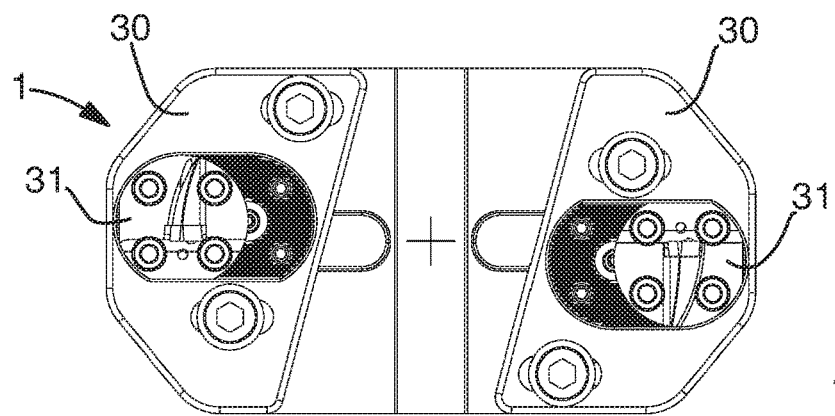
FIG. 3 is a front view of the rotatable tool as in FIG. 1.

The top surfaces of the first and the second inserts 5, 5' are located in different planes, i.e. not in a common plane. The first and the second cutting inserts 5, 5' are located, i.e. mounted, upside down relative to each other, when the rotatable tool 1 is viewed with the front against the viewer, as can be seen in FIG. 3. The first and the second cutting inserts 5, 5' are located on opposite sides of the tool center axis A2. When the tool 1 is rotated 180 degrees around the tool center axis A2, the first cutting insert 5 is at the starting position of the second cutting insert 5', and vice versa.

The rotatable tool 1 is suitable to be rotatable around a tool center axis A2 thereof in one way, or in one rotational direction only. That direction is such that the top surface of each cutting insert 5, 5' is moving in front of the bottom surface of that cutting insert.

Figure 4:
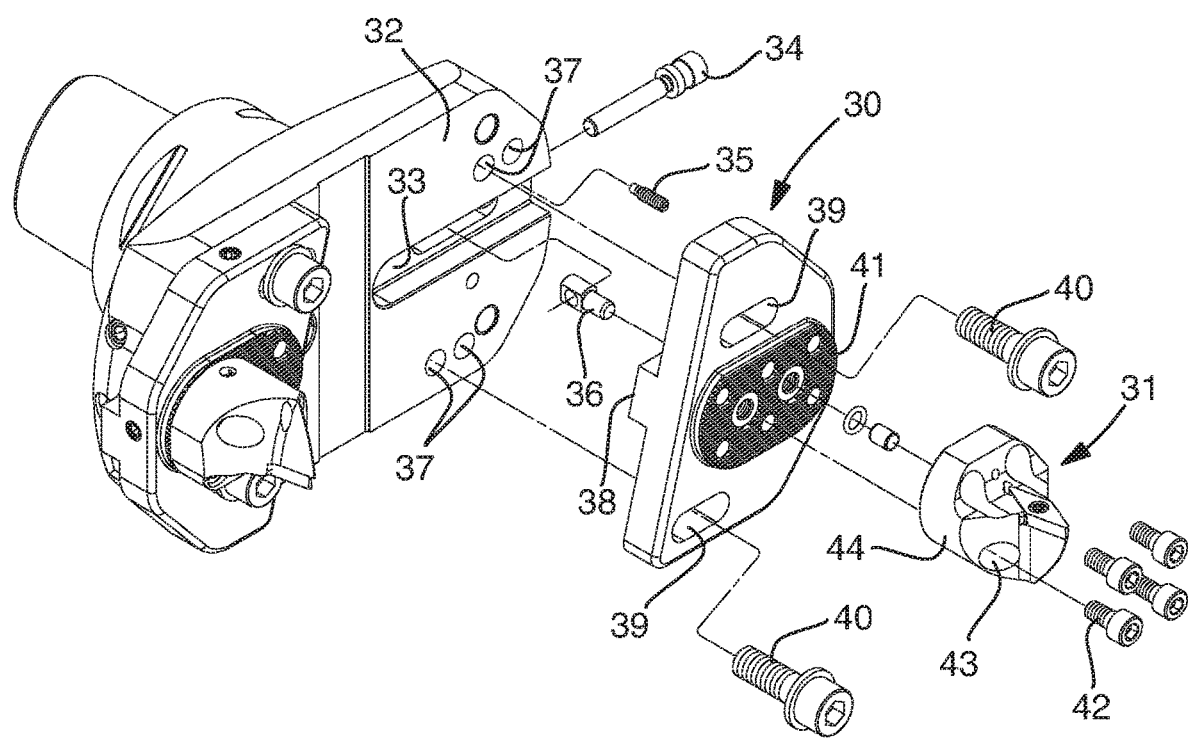
FIG. 4 is perspective exploded view of the rotatable tool as in FIGS. 1-3, showing the slide and cutting head in detail.

The rotatable tool has radial positioning means 30-42 such that at least one of the first radially outer cutting edge 6 and second radially inner cutting edge 7' can be positioned on at least two different radial distances from the tool center axis A2. These radial positioning means are shown in FIG. 4, the rotatable tool 1 includes slides 30, which are attachable to the tool body part 2 by fixation means in the form of screws 40, which can be attached in threaded holes 37 in the tool body part 2, whereby the screws penetrate through holes 39 in the slides. The holes 39 are elongated in such a way that a screw 40 which penetrate a screw hole 39 can be attached in two separate threaded holes 37. In such way two different radial positions, i.e. radial distances from the tool center axis A2, of the slide 30, are possible. By this, the tool 1 can be used for machining circular grooves of a wider diameter range.

Each slide 30 has a rear elongated ridge 38, arranged to be located in a corresponding elongated groove 33 in the tool body part 2, and an opposite front attachment surface 41. Each attachment surface 41 is formed to hold a cutting head 31. The cutting head 31 has an insert seat where a cutting insert 5, 5' is or can be clamped, e.g. by means of a screw or a clamp. Adjoining the seat is a curved support 44, which is curved in a way such that there is enough clearance when cutting, while at the same time support the insert 5, 5'.

The cutting head 31 further includes an attachment surface arranged to be mounted, i.e. firmly connected, to the attachment surface 41 of the tool body part 2, by attachment means in the form of screws 42, which penetrate through holes 43 in the cutting head 31. The two cutting heads 31, which are part of the rotatable tool 1, are different in shape. More specifically, the insert seats, which are suitable for the cutting inserts 5, 5', are different in such a way that the cutting inserts 5, 5' when mounted have their respective radially outer cutting edges 6, 6' at different angles. The cutting head 31 can be mounted on two different radial positions against the attachment surface 41. By this, the tool 1 can be used for machining circular grooves of a wider diameter range. The slide can be radially adjusted, i.e. set, in a step less manner, i.e. fine adjustment. This functionality is possible by an arrangement, where by turning an adjustment screw 34, which passes through a threaded through hole in a pull-pin 36, the slide 30 moves radially by a force applied from the pull-pin 36. During fine-adjustment, screws 40 shall be in an open position, i.e., in a position such that the slide 30 can move relative to the tool body part 2. After fine-adjustment, the screws 30 are tightened such that the slide 30 is firmly locked or attached to the tool body part 2.

Figure 5:
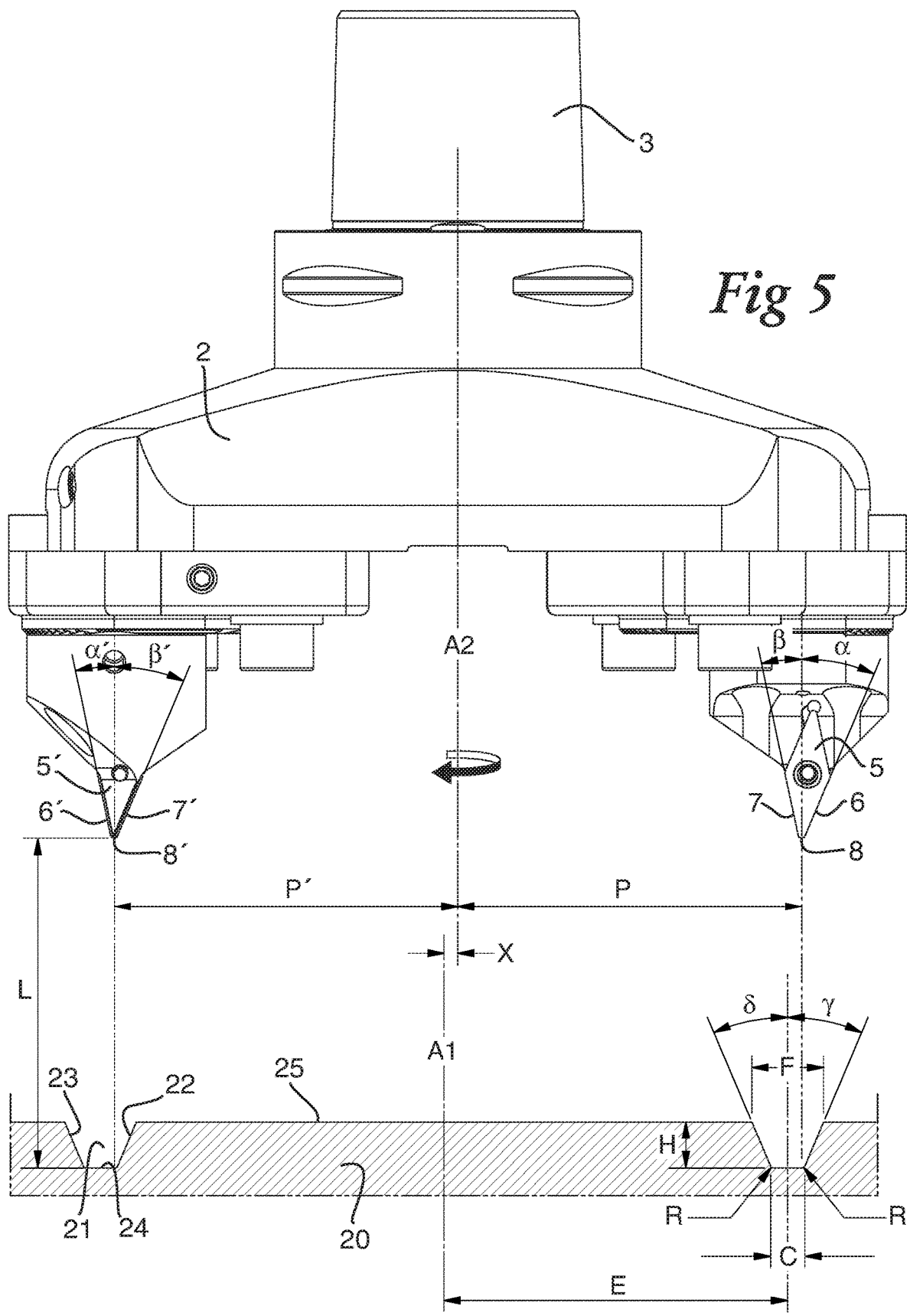
FIG. 5 is a side view of the rotatable tool as in FIGS. 1-4, as well as a work piece in which a circular groove has been formed by metal cutting using the rotatable tool.

In FIG. 5, it is shown that each of the inserts 5, 5', which have a parallelogram shape, are located such that a radially outer cutting edge 6, 6' and radially inner cutting edge 7, 7' extends in a longitudinally forward direction, i.e. towards the metal work piece 20 or away from the rear coupling portion 3, and are connected by a corner cutting edge 8, 8'. Each radially inner cutting edge 7, 7' is located between a radially outer cutting edge 6, 6' of the same insert 5, 5' and the tool center axis A1. The first radially outer cutting edge 6, part of the first cutting insert 5, forms an first outer edge angle $\alpha$ with the tool center axis A2. The first radially inner cutting edge 7, part of the first cutting insert 5, forms a first inner edge angle $\beta$ with the tool center axis A2. The angles $\alpha$ and 13 are measured or determined as in FIG. 5. The rotating tool 1 is arranged perpendicular to a viewing direction such that the first and second cutting inserts 5, 5' are at a largest distance from each other, when the viewer observes the rotating tool 1. Then, the rotating tool 1 is projected on a plane, which includes the tool center axis A2. Then, the angles $\alpha$ and $\beta$ are measured or determined.

In a corresponding way, the radially outer cutting edge 6' of the second cutting insert 5' forms an second outer edge angle $\alpha'$ with the tool center axis A2, and the inner cutting edge 6' of the second cutting insert 5' forms a second inner edge angle $\beta'$ with the tool center axis A2. The radially outer cutting edges 6, 6' of the first and second cutting inserts 5, 5' converge away from the rear coupling part 3 at an area or point located at a distance from the tool center axis A2, the area or point being closer to the corner cutting edge 8' of the second cutting insert 5' than the corner cutting edge 8 of the first cutting insert 5.

The first outer edge angle $\alpha$ is larger than the second outer edge angle $\alpha'$, and the second inner edge angle $\beta'$ is larger than the first inner edge angle $\beta$. In this way, only one cutting edge, i.e. the radially outer cutting edge 6 of the first cutting insert 5, will generate or cut the final shape of the outer wall surface 23 of the circular groove 21. In a corresponding way, only one cutting edge, i.e., the second radially inner cutting edge 7', part of the second cutting insert 5', will generate or cut the final shape of the inner wall surface 22 of the circular groove 21. By this, any dimensional tolerances or imperfections in the rotating tool 1 including the cutting inserts 5, 5' will be reduced. A further benefit is that the same sets of inserts, e.g. two inserts with 35 degree nose angle, can be used for machining or cutting finishing circular grooves of different outer and inner wall angles $\delta$, $\gamma$. The nose angle of the inserts 5, 5' in FIGS. 1-5, i.e., the angle between radially outer 6, 6' and radially inner 7, 7' cutting edges is 35 degrees, a common ISO turning insert designation being VBMT.

In FIG. 5, the metal work piece 20 is shown. It shown how the circular groove 21 is formed in the work piece after a machining operation, i.e. metal cutting. The circular groove 21 has a groove center axis A1. The circular groove is formed in, and has an opening in, a surface 25 of the work piece 20, which is perpendicular, at least in an area adjacent the circular groove 25, to a groove center axis A1. The circular groove is tapered in such a way that it is widest at the opening and has a most narrow portion thereof at a bottom surface 24. The bottom surface 24 is located perpendicular to the groove center axis A1. The circular groove 21 has a depth H, which is the distance from the bottom surface 24 to the opening, i.e. the surface 25, measured parallel to the groove center axis A1. The circular groove 21 has a width of the opening F, and a width of the bottom surface C, both distances measured perpendicular to the groove center axis. The width of the opening F is larger than the width of the bottom surface C. For example, F is within the range 5-18 mm, H is within the range 3-9 mm, C is within the range 1.5-11 mm, $1.6<F/C<2.8$, $1.4<F/H<2.2$, and $0.7<H/C<2.0$.

The circular groove 21 has an inner wall surface 22, which forms an inner wall angle $\delta$ with the groove center axis A1. The circular groove 21 has an outer wall surface 23, which forms an outer wall angle $\gamma$ with the groove center axis A1. The inner wall surface 22 is located between the outer wall surface 23 and the groove center axis A1.

When producing or making a finished circular groove by machining or cutting, the rear coupling part 3 of the rotatable tool 1 is clamped in a machine tool spindle. It rotates around the tool center axis A2 thereof, i.e., a first rotation. The number of revolutions per minute can be above 60 and the number of revolutions per minute being less than 1000.

The tool center axis is set parallel and at a distance X from the groove center axis A1, i.e. a center axis A1 of a circular groove 21 which is to be produced. The tool center axis A2, and hence the rotatable tool 1, is rotated around the groove center axis A1. This second rotation is preferably in an opposite direction to the rotational direction of which the rotating tool 1 rotates around the tool center axis A2 thereof. The benefit of this is a longer tool-life. This second rotation is of a lower number of revolutions per minute than the number of revolutions per minute of the first rotation. Further, this second rotation has a number of rotations per minute, which is between $\frac{1}{20}$ to $\frac{1}{200}$ of the value of the first rotation. In other words, when the rotatable tool 1 has rotated between 20 and 200 revolutions around the tool center axis A2 thereof, the tool center axis A2 has rotated 1 revolution around the groove center axis A1. Both rotations are preferably of a constant value at least during the part of the operation in which the cutting inserts 5, 5' are in cut.

The rotatable tool 1 has a movement towards the work piece 20 in a longitudinal direction, i.e. a longitudinal feed. This longitudinal feed is preferably at a constant rate. As the corner cutting edges 8, 8' reaches the surface 25 of the work piece 20, the formation of the circular groove 21 starts, i.e. the cutting inserts 5, 5' go into cut, and chips from the work piece 20 are removed. The movement in the longitudinal direction, i.e. the longitudinal feed, stops when at least one of the corner cutting edges 8, 8' reaches the bottom surface 24 of the circular groove 21.

From the point where at least one of the corner cutting edges 8, 8' go into cut, i.e. enters the work piece, until at least one of the corner cutting edges 8, 8' reaches the bottom surface 24 of the circular groove 21, the distance X is gradually reduced. With this method, chip thickness is reduced. This gives the possibility of increased cutting data, e.g. cutting speed, which reduces the cutting time. All motions are relative motions between the rotatable tool 1 and the metal work piece 20.

The metal work piece 20 is still, i.e. does not move, during the machining operation or cutting. Described in a different way, a distance L is a longitudinal distance, i.e., parallel to the groove center axis A1 and the tool center axis A2, from the bottom surface 24 of the circular groove 21 to the corner cutting edges 8, 8', or to the one of the cutting edges 8, 8', which is closest to the bottom surface 24. When L is equal to H, the cutting starts. When L is equal to zero, the cutting stops. Then the rotatable tool 1 is retracted, i.e. moved in a direction away from the bottom surface 24 of the circular groove 21, preferably in a longitudinally rearward direction parallel to the groove center axis A1.

Each cutting insert 5, 5' has a nose angle, i.e., $\alpha+\beta$ or $\alpha'+\beta'$, which is smaller than groove angle, i.e., $\delta+\gamma$. In this way, the same set of inserts can be used for grooves having a wide range of groove angles. Also, the bottom surface 24 of the circular groove 21 has a different shape than the corner cutting edges 8, 8'. Hence, the rotatable tool 1 does not have cutting inserts 5, 5' that have a corresponding shape to the circular groove 21 to be machined or cut.

The corner cutting edges 8, 8' are longitudinally spaced apart by less than 2 mm, even more by less than 0.5 mm They do not have to be longitudinally spaced apart. The distance P, which is the distance from the tool center axis A2 to the corner cutting edge 8 of the first cutting insert 5, and P', which is the distance from the tool center axis A2 to the corner cutting edge 8' of the second cutting insert 5', are so related that P is greater than or equal to P'. P may be equal to P' or P can be less than 1 mm longer than P'.

The radially outer and radially inner cutting edges 6, 6', 7, 7' may have a length of 2-30 mm, for example, 4-12 mm. The rotatable tool 1 has a clearance between the cutting inserts 5, 5', in other words, there is no material of the rotatable tool 1 between the radially inner cutting edges 7, 7'.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

What is claimed is:

1. A method for forming by metal cutting a circular groove in a metal work piece, the method comprising the steps of:
providing a rotatable tool, the rotatable tool including a front end, a rear end and a tool center axis, the tool being rotatable in a given direction of rotation around the tool center axis, which is a longitudinal axis of the rotatable tool, a first cutting insert and a second cutting insert located on opposite sides of the tool center axis and at a distance from the tool center axis, the first cutting insert including a first radially outer cutting edge, and a first radially inner cutting edge connected to the first radially outer cutting edge by a first corner cutting edge, and the second cutting insert including a second radially inner cutting edge and a second radially outer cutting edge connected to the second radially inner cutting edge by a second corner cutting edge, wherein the first radially outer cutting edge is located at a larger radial distance from the tool center axis than any other cutting edge of the rotatable tool, and the second radially inner cutting edge being located at a smaller radial distance from the tool center axis than any other cutting edge of the rotatable tool;
providing the metal work piece, the metal workpiece having an upper surface perpendicular to a groove center axis of the circular groove to be formed in the metal workpiece;
setting the tool center axis parallel and at a distance from the groove center axis;
rotating the rotatable tool around the tool center axis;
rotating the tool center axis around the groove center axis;
moving the rotatable tool in a forward longitudinal direction towards the work piece, such that the first radially outer cutting edge and the second radially inner cutting edge of the rotatable tool enter the metal work piece; and
gradually decreasing the distance between the tool center axis and the groove center axis while simultaneously moving the rotatable tool in the forward longitudinal direction, thereby forming the circular groove in the metal work piece, the circular groove including a bottom surface, an inner wall surface formed by the second radially inner cutting edge, and an outer wall surface formed by the first radially outer cutting edge, the circular groove forming an opening in the upper surface of the work piece perpendicular to the groove center axis.

2. The method according to claim 1, further comprising the steps of entering the work piece with the first and second corner cutting edges, and when the first and second corner cutting edges enter the work piece setting X=(F+P−P')/2, where X is the distance between the tool center axis and groove center axis, P is a distance that the first corner cutting edge is located from the tool center axis, P' is a distance that the second corner cutting edge is located from the tool center axis and F is a width of the opening of the circular groove, the width F being in a first plane perpendicular to the groove center axis.

3. The method according to claim 2, further comprising the steps of when the first and second corner cutting edges are at the bottom surface of the circular groove, setting X=(C+P−P')/2, where C is a width of the bottom surface of the circular groove, the width C being in a second plane perpendicular to the groove center axis.

4. The method according to claim 2, further comprising the step of setting P+P'=2E, where E is a distance from the groove center axis to a center point of the bottom surface of the circular groove.

5. The method according to claim 2, further comprising the step of setting P≤P'+C/2, where C is a width of the bottom surface of the circular groove, the width C being in a second plane perpendicular to the groove center axis.

6. The method according to claim 1, wherein the first radially outer cutting edge forms a first outer edge angle with the tool center axis, the second radially outer cutting edge forms a second outer edge angle with the tool center axis, wherein the first radially inner cutting edge forms a first inner edge angle with the tool center axis, and wherein the second radially inner cutting edge forms a second inner edge angle with the tool center axis.

7. The method according to claim 6, further comprising the steps of setting the first outer edge angle to be equal to an outer wall angle, the outer wall angle being an angle the outer wall surface forms with the groove center axis; setting the second inner edge angle to be equal to an inner wall angle, the inner wall angle being the angle the inner wall surface forms with the groove center axis; setting the sum of the first outer edge angle and the first inner edge angle to be smaller than the sum of the outer wall angle and the inner wall angle; setting the sum of the second outer edge angle and the second inner edge angle to be smaller than the sum of the outer wall angle and the inner wall angle; and forming the bottom surface such that the bottom surface is located in a plane perpendicular to the groove center axis.

8. The method according to claim 1, wherein the method is for forming a seal ring groove.

9. The method according to claim 1, further comprising the steps of providing a computer numerical control machine and connecting the rotatable tool to the computer numerical control machine.

\* \* \* \* \*